2 Sheets—Sheet 1.
D. FITZGERALD.
Elevated-Railway.
No. 8,362. Reissued Aug. 6, 1878.
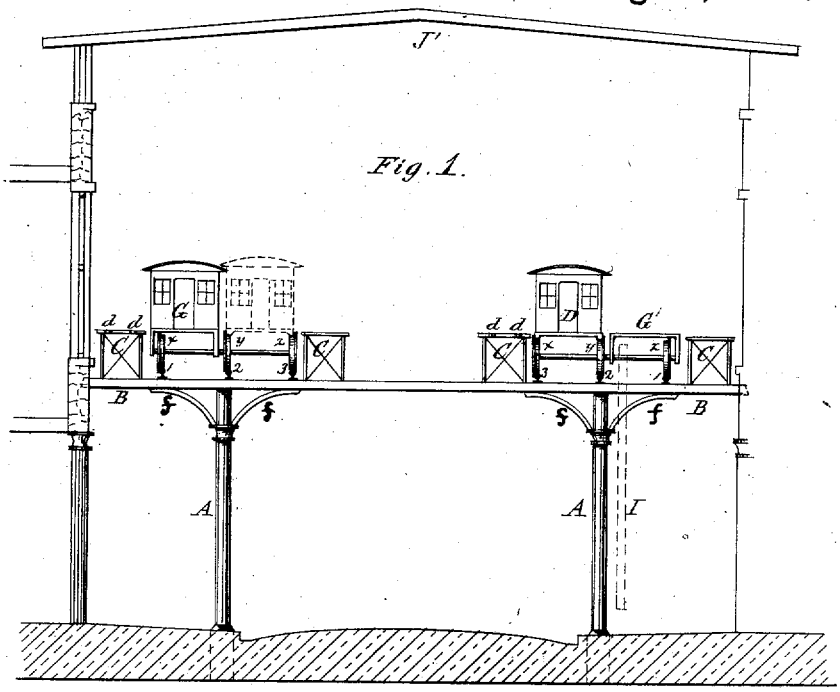
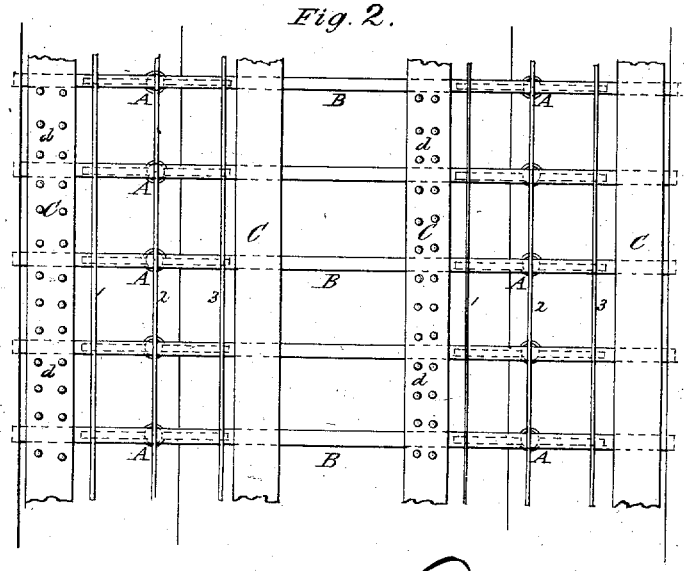
Attest:
Edward H. Wales
Chas. M. Higgins
Inventor:
Daniel Fitzgerald
by his Attorneys:
S. H. Wales & Son

D. FITZGERALD.
Elevated-Railway.

No. 8,362. Reissued Aug. 6, 1878.

*Attest:*

Edward H. Wales.
Chas. M. Higgins.

*Inventor:*

Daniel Fitzgerald
by his Attorneys
S. H. Wales & Son

UNITED STATES PATENT OFFICE.

DANIEL FITZGERALD, OF NEW YORK, N. Y.

IMPROVEMENT IN ELEVATED RAILWAYS.

Specification forming part of Letters Patent No. 121,605, dated December 5, 1871; Reissue No. 8,362, dated August 6, 1878; application filed June 15, 1878.

*To all whom it may concern:*

Be it known that I, DANIEL FITZGERALD, of New York city, have invented certain new and useful Improvements in Railways, of which the following is a specification:

The main object of my invention is to provide a system of elevated railways for city streets, for the transportation of passengers, &c., capable of sustaining a double track and double line of cars, one track and line of cars on each side of the structure, without obstructing the general traffic on the street below; and the invention consists in the general formation of the supporting-structure of the railway and in the peculiar plan of rolling-stock, and mode of propulsion used thereon, as hereinafter fully set forth.

Figure 3:
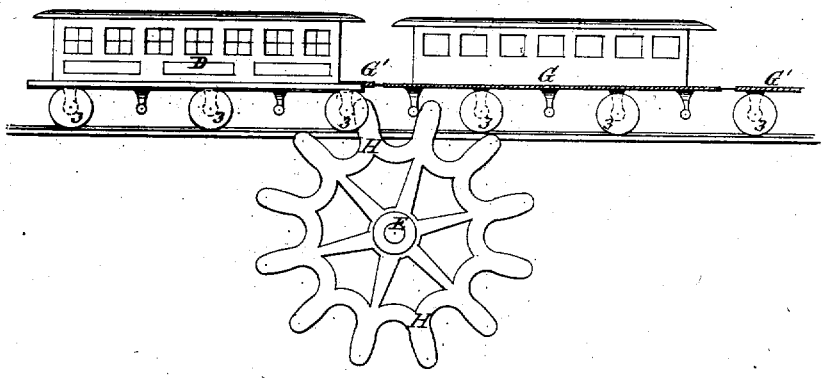
Figure 4:
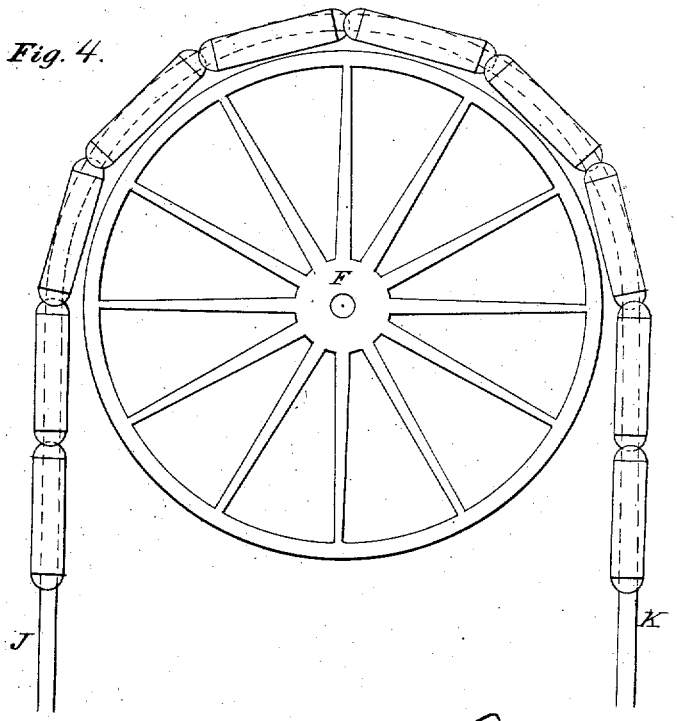

In the drawings annexed, Figure 1 represents a transverse section or end elevation of my improved elevated railway, showing a cross-section of a street on which the same is erected. Fig. 2 is a plan view of the same, which, in connection with Fig. 1, illustrates the general formation of the supporting-structure. Fig. 3 is a fragmentary side elevation, illustrating a portion of the propelling mechanism, and Fig. 4 is a plan view of another portion of such mechanism used in turning curves.

I will first describe the formation of the supporting-structure of the railway, and then the peculiar plan of rolling-stock and propelling mechanism which I have designed for use thereon.

As shown in Figs. 1 and 2, I erect standards or upright pillars A A in parallel lines or rows, one line on either side of the street, the pillars being preferably situated at the edge of each curb, as shown, so as to leave the road or driveway entirely free and unobstructed for general vehicle traffic. These pillars are securely founded beneath the pavement, as indicated in Fig. 1, and rise to a sufficient height above it to permit free traffic under the elevated track.

The pillars are surmounted and joined at the top by cross ties or braces B B, which connect the double line of pillars together, thereby bracing them and holding them as firmly at the top as they are held at the bottom, and thus forming a structure of sufficient width and strength to support a double track and double line of cars, the double track being on the same level or one track, with its line of cars being arranged on each side of the street or structure, as shown in Figs. 1 and 2 of the drawings.

The cross-beams B B extend across and span the roadway, as shown, and support the tracks, the rails 1 2 3 of which are laid thereon and made fast thereto in a suitable manner, as shown in Figs. 1 and 2, the rails being preferably situated directly over the line of the pillars and centrally thereof, as shown.

The cross beams or braces B B may, if desired, be extended across the entire width of the street, including the sidewalks, and the extreme ends of the beams may be inserted in the front walls of the buildings on each side of the street, as shown, for additional support, and to prevent any possible lateral deflection of the elevated structure.

In addition to the connecting cross-beams B, lateral brackets or braces *f f* extend from the pillars to the beams, diagonally across the internal angle or corner which the cross-beams form with the pillars, thus connecting the upper part of the pillars with the connecting ends of the cross-beams B on each side of the pillars, and thus serving to more firmly support the ends of the beams and to connect the pillars and beams more rigidly together.

This general construction forms a light and airy structure, which is so braced or connected together as to furnish sufficient width and strength to support a number of tracks without obstructing the traffic of the street on which it may be erected.

Cars having suitable form and means of propulsion may be run upon the structure, and I will now describe the novel system of cars which I have designed for this purpose, and which forms part of the present invention.

The object of this feature of the invention is to establish a system of cars in two trains or lines, one for fast and the other for slow travel, the motion of one train or line of cars to give motion to and operate the other line; and the plan also contemplates a continuous line, which shall traverse up and down opposite sides of a street, respectively, or up one street and down an adjacent one.

With this object in view I construct a continuous line of cars or car-trucks, which are mounted on suitable tracks or rails, and, as shown in Fig. 1, these tracks are preferably made wider than usual, and the car-axles have each three wheels, *x y z*. Of these the two outer ones only need rails; but for heavy loads a center rail is sometimes used.

G G′, Fig. 1, represent cars of the continuous line, termed the "belt," the greater part of which is composed of platform-cars or car-trucks G′. They may be disconnected, but are usually coupled together, forming an uninterrupted line, the continuity of the line remaining substantially unbroken, but passing around a curve or curves at the terminus of the railway, and coming back as the return train, the tracks J and K being united at the ends of the route, as illustrated in Fig. 4. To assist in turning short curves, and to reduce the friction, I introduce, where necessary, a horizontally-revolving drum, F, Fig. 4, which will take the lateral pressure of the train, urge it around the curve, and relieve the strain against the sides of the rails.

On each side of the track, in close proximity to the cars, platforms C are built, forming an elevated sidewalk extending throughout the length of the railway, and leaving a channel in which the cars run, and which also serves to retain them in place when in motion and in case of accident. Such platform, in some instances, will entirely cover the street below, and provision is made for admitting light through the platform or walk by lenses *d*, or otherwise.

The belt line is propelled by any power or machinery adapted thereto.

In Fig. 3 I have shown a large revolving wheel, E, representing one of a number placed at intervals along the line. Such wheels have projections H to engage in some part of each car of the line and drive them forward, the wheels to be turned by any motive power. Their location is indicated in Fig. 1 by the dotted lines I. But the cars may be driven by various other means.

The above description embraces the chief features of one of the lines of cars of which my railway system is composed. Said line receives a continuous movement at a speed which will admit of passengers stepping from either of the platforms or sidewalks C to or from the cars while they are in motion.

To add a line of cars to run at a higher rate of speed than those before described, and have them propelled without a separate power, the cars of the first line are placed at one side of their trucks and of the center wheel above referred to. The car-trucks are so constructed as to expose the upper portion of the periphery of two of the wheels, and upon these exposed and projecting peripheries of the said wheels I place the transit or independent cars D. The portions of these cars which rest on the wheels aforesaid may be shod with rails to receive the friction, and the flanges of the wheels guide and hold the cars thereon. When motion is given to the belt line of cars the independent or transit cars are carried forward with the augmented speed which is due to the difference between the forward movement through space of the top of the wheel over the corresponding movement of the axis of the wheel as it advances, so that the speed of the transit-cars will be about double that of the belt line. It is also practicable to have the transit-cars to ride on wheels or cylinders other than those which roll on the rails, said wheels or cylinders to be on the same axle, but of larger diameter. In such case the speed of the transit-cars will be further increased in proportion to the enlarged size of the wheels that impel them.

The intention being to keep the belt line in constant motion, when it is required to enter one of the transit-cars, the passengers having first got on one of the platform-cars G′, the independent car D is brought to rest on the belt line by removing its bearings from the periphery of the wheels. Afterward the bearing of the transit-car is replaced on the periphery of the wheels, when it again goes forward with its accustomed speed. In effecting these transfers to and from the peripheries of the car-wheels suitable brakes are employed to act on some part of the cars of the belt line.

In the invention it is also contemplated to completely inclose the line of travel by a roofing, J′, above, and by sashes and blinds at the crossing of intersecting streets, to protect the entire route from rough weather and storms. Such roof is to be chiefly sash and glass, with proper openings for ventilation; and to render the whole route comfortable and pleasant in all weather provision may be made for warming by steam or hot air or other means in winter, and for cooling by fans and cool air or otherwise in summer.

In the above invention I do not confine myself to precise forms or minute details, but shall vary the same as circumstances and occasion may require; and

What I claim as constituting my invention is as follows:

1. A double-track elevated railway structure for city streets, formed of two parallel lines of upright pillars, A A, one line rising from either side of the street and having the tracks 1 2 3 laid directly over the lines of the pillars and centrally thereof, one track over each line of pillars, in combination with the cross ties or braces B B, extending from one line of pillars to the other, and serving to laterally connect and brace the said lines of pillars at the top, substantially as herein shown and described.

2. The combination, with the wheels of the continuous line of car-trucks, of the rapid movement or transit cars propelled by frictional contact with the peripheries of said wheels, substantially as described.

3. The main line of cars, and therefore the continuous line of trucks, constructed and arranged as described, in combination with the transit-cars propelled by the peripheries of the wheels of such trucks, as aforesaid, whereby the same trucks are employed for separate lines of cars traveling at different rates of speed, substantially as described and represented.

4. In combination with the rapid or transit cars, propelled as aforesaid, the traveling platforms or platform-cars forming part of the continuous line of trucks, to enable passengers to reach the cars of either line while the main line is under way, as herein described.

5. The mode of propelling the main line of cars or trucks, which consists in causing the driving-wheels E to engage with fixed projections on the cars, substantially as herein set forth.

DANIEL FITZGERALD.

Witnesses:
CHAS. M. HIGGINS,
EDWARD H. WALES.